US012596692B2

(12) United States Patent　(10) Patent No.:　US 12,596,692 B2
Collins et al.　(45) Date of Patent:　Apr. 7, 2026

(54) SOURCE SCORING FOR ENTITY REPRESENTATION SYSTEMS

(71) Applicant: LiveRamp, Inc., San Francisco, CA (US)

(72) Inventors: Dwayne Collins, Conway, AR (US); Pavan Roy Marupally, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 200 days.

(21) Appl. No.: 18/019,736

(22) PCT Filed: Aug. 3, 2021

(86) PCT No.: PCT/US2021/044267
§ 371 (c)(1),
(2) Date: Feb. 3, 2023

(87) PCT Pub. No.: WO2022/035638
PCT Pub. Date: Feb. 17, 2022

(65) Prior Publication Data
US 2024/0256502 A1　　Aug. 1, 2024

Related U.S. Application Data

(60) Provisional application No. 63/063,791, filed on Aug. 10, 2020.

(51) Int. Cl.
*G06F 16/215*　　(2019.01)
*G06F 16/28*　　(2019.01)
*G06F 16/901*　　(2019.01)

(52) U.S. Cl.
CPC .......... *G06F 16/215* (2019.01); *G06F 16/288* (2019.01); *G06F 16/9024* (2019.01)

(58) Field of Classification Search
CPC ... G06F 16/215; G06F 16/288; G06F 16/9024
See application file for complete search history.

(56) References Cited

U.S. PATENT DOCUMENTS 9,251,470 B2　2/2016　Hua et al.
9,275,114 B2　3/2016　Milton et al.
(Continued)

OTHER PUBLICATIONS

Yin, Xiaoxin et al., "Semi-Supervised Truth Discovery," WWW 2011-Session:Trust and Diversity (2011).
(Continued)

*Primary Examiner* — Sherief Badawi
*Assistant Examiner* — J Mitchell Curran

(57) ABSTRACT

A method for computationally scoring the trustworthiness of source data begins with a subset of the raw source data. Fields and related fields are identified, profiled, and results aggregated. In addition, the subset of raw source data is input to an entity resolution system, with results summarized and aggregated. The output of these two streams of processes are used to compute a scorecard. In addition, a sandbox of the entity resolution system's data graph is constructed, the sandbox is modified with the source data, and the difference between the baseline sandbox and modified sandbox is computed. Changes to entities are computed for all entities as well as for most sought-after entities, and the results are summarized and aggregated into the overall scorecard.

9 Claims, 4 Drawing Sheets

(56) References Cited

U.S. PATENT DOCUMENTS

| | | | |
|---|---|---|---|
| 9,311,301 B1 | 4/2016 | Balluru et al. | |
| 9,348,891 B2 | 5/2016 | Srivastava et al. | |
| 9,659,052 B1 * | 5/2017 | Glennon | G06F 16/215 |
| 9,794,358 B1 | 10/2017 | Jurgens | |
| 10,078,679 B1 | 9/2018 | Shefferman et al. | |
| 10,339,147 B1 * | 7/2019 | Barmes | G06N 5/046 |
| 12,316,610 B1 * | 5/2025 | Muth | H04L 63/0435 |
| 2012/0278297 A1 | 11/2012 | Yin et al. | |
| 2016/0371435 A1 * | 12/2016 | Pauletto | G06F 16/24573 |
| 2017/0154058 A1 * | 6/2017 | May | G06F 16/215 |
| 2018/0203920 A1 * | 7/2018 | Chen | G06F 16/2465 |
| 2019/0303494 A1 * | 10/2019 | Meyer | G06Q 30/01 |
| 2019/0361853 A1 * | 11/2019 | Lutsaievska | H04M 3/5175 |
| 2019/0392075 A1 * | 12/2019 | Han | G06F 16/285 |
| 2021/0042333 A1 * | 2/2021 | Edwards | G06F 16/288 |
| 2022/0164374 A1 * | 5/2022 | Herrera | G06F 7/02 |

OTHER PUBLICATIONS

Deng, Yang et al., "MedTruth: A Semi-Supervised Approach to Discovering Knowledge Condition Information from Multi-Source Medical Data," arXiv:1809.10404v2 (Aug. 19, 2019).

Fang, Xiu Susie et al., "Value Veracity Estimation for Multi-Truth Objects via a Graph-Based Approach," IW3C2 Companion (Apr. 3-7, 2017).

Li, Yaliang et al., "A Survey on Truth Discovery," arXiv:1505.02463v2 (Nov. 4, 2015).

Pasternack, Jeff et al., Knowing What to Believe (When You Already Know Something), Procs. of the 23rd Int'l Conf. on Computational Linguistics (coling 2010) (Aug. 2010).

* cited by examiner

SOURCE SCORING FOR ENTITY REPRESENTATION SYSTEMS

CROSS-REFERENCE TO RELATED APPLICATIONS

This application claims the benefit of U.S. provisional patent application No. 63/063,791, filed on Aug. 10, 2020. Such application is incorporated herein by reference in its entirety.

BACKGROUND

An entity resolution system is a computerized system that includes both a data structure to store data points concerning a specific universe of entities and an interface for externally derived queries about the universe of those entities. In this context, an entity can be any contextually indivisible unit such as a person, a group of persons sharing a common relationship (household, economic buying unit, etc.), touch-point type instance (email addresses, phone numbers, postal addresses, IP addresses), product/service, account, etc. Many types of entities are defined in a very specific context or use case. For example, an entity resolution system includes a data structure that operates to process data concerning a very specific universe of persons and households in order to attempt to positively identify each from among a much larger and more generally defined population of entities. Similarly, but in a much different context, a synchronized authentication system is a computerized system that attempts to dynamically directly pair entities from one specialized universe of entities with entities from one or more other specialized universes of entities.

An entity resolution system may use a data graph, which is a data structure used to store data points pertaining to entities and the relationships between those entities. A data graph consists of a large set of assertions describing entities. Nodes in the data graph may represent individual data points (an address, email address, etc.); an individual entity (person, business, etc.); or a collection of entities (household, buying unit, etc.). The nodes are connected by edges, which establish the relationships between the nodes. For example, an edge between a telephone number node and a person node may indicate that the person may be reached at this telephone number. By building and then traversing a data graph, information concerning the relationships between all of this data stored in this data structure may be understood. A data graph that is used for purposes of resolving the identity of particular entities, such as persons and households, may be referred to as an identity graph. The assertions may include personally identifiable information (PII) as well as non-PII attributes. In a typical commercial data graph maintained by a commercial data services provider, a substantial quantity of the assertions are purchased or contracted for from a large number of data vendors for periods of one or more years.

Each entity system is built from multiple sets of data structure assertions that explicitly describe the associated entities. These assertion sets come from multiple sources, and for many types of entities such as persons and households there is no meaningful definition of the classical notion of "accuracy" to measure the correctness of the data structures in the system. Hence there are at least two significant potential problems with the realization of the computerized system. The first problem is to determine the trustworthiness or believability of new candidate data sources that are considered for addition to the data graph. The notions of believability and trustworthiness are a meaningful heuristic to the notion of correctness and accuracy for those entity cases where accuracy cannot be measured. The second problem is to efficiently determine the impact of existing data sources already in realization of the universe, with respect to the effective reach and contribution to defensible decisions within the system. Here, decisions may include, for example, the determination of whether two different persons stored in the system (such as may be associated with two different nodes within the data graph) are actually the same person and should thus be consolidated.

The first problem is to determine the trustworthiness or believability of new candidate data sources that are considered for addition to the data graph. The expected impact of the addition of this new data to the effective reach and defensibility of the truth of the data in the resulting data graph would ideally be known before the data is added. Presently, data vendors often provide a sample of their data for evaluation. But this data is typically the data vendor's most highly curated records, and thus is not representative of the entire data set. Data vendors rarely will provide their full data set for evaluation before purchase. This problem makes the extrapolation of the analysis of the highly curated sample to the full data set questionable, unless there is additional evidence available that the sample behaves in a manner similar to that of a random sampling of the data vendor's data that is being offered.

The second problem is to efficiently determine the impact of existing data sources already in the data graph, with respect to the effective reach and contribution to defensible decisions within the overall entity resolution system. This problem is related to the first problem, but in this case the question relates to the full set of assertions already contained in the data graph.

Existing efforts to solve these problems are based primarily on relationships with known source providers or sales pitches about the data. If there is any "analysis" it is performed by visually looking at a small proportion of the samples provided, or focusing on values of a very small set of fields (often social security number or date of birth). This analysis takes weeks to perform. The effect of this approach is the purchase of a substantial amount of duplicate data that was already in the data graph as well as very unbelievable or non-trustworthy data at the record entity level, which lowers the quality of the data graph and the overall effectiveness of the entity resolution system.

It would be desirable to develop a system and method for solving both of these problems analytically and computationally in order to produce a data graph—and thus an overall entity resolution system—that provides highly defensible entity resolution results while simultaneously providing a data graph with the greatest possible reach. References mentioned in this background section are not admitted to be prior art with respect to the present invention.

SUMMARY

The present invention is directed to a method for computationally scoring the trustworthiness or believability of source data for an entity resolution data graph, including data that is considered for inclusion in the data graph as well as data that already resides in the data graph. In certain embodiments, the present invention allows the data services provider who maintains the data graph to quantitatively determine the impact of the data in terms of defensibility of the results of the entity resolution system as well as the effective reach of the entity resolution system's decisions.

Because the results are computed and objective, the system and method puts all data source vendors on a common framework for evaluation, rather than allowing for subjective factors in human determinations. In certain implementations, each data source can be scored within only one or two days, thus greatly speeding up the process of evaluation of a data source.

These and other features, objects and advantages of the present invention will become better understood from a consideration of the following detailed description of certain embodiments in conjunction with the drawings and appended claims.

DRAWINGS

DETAILED DESCRIPTION OF CERTAIN EMBODIMENTS

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
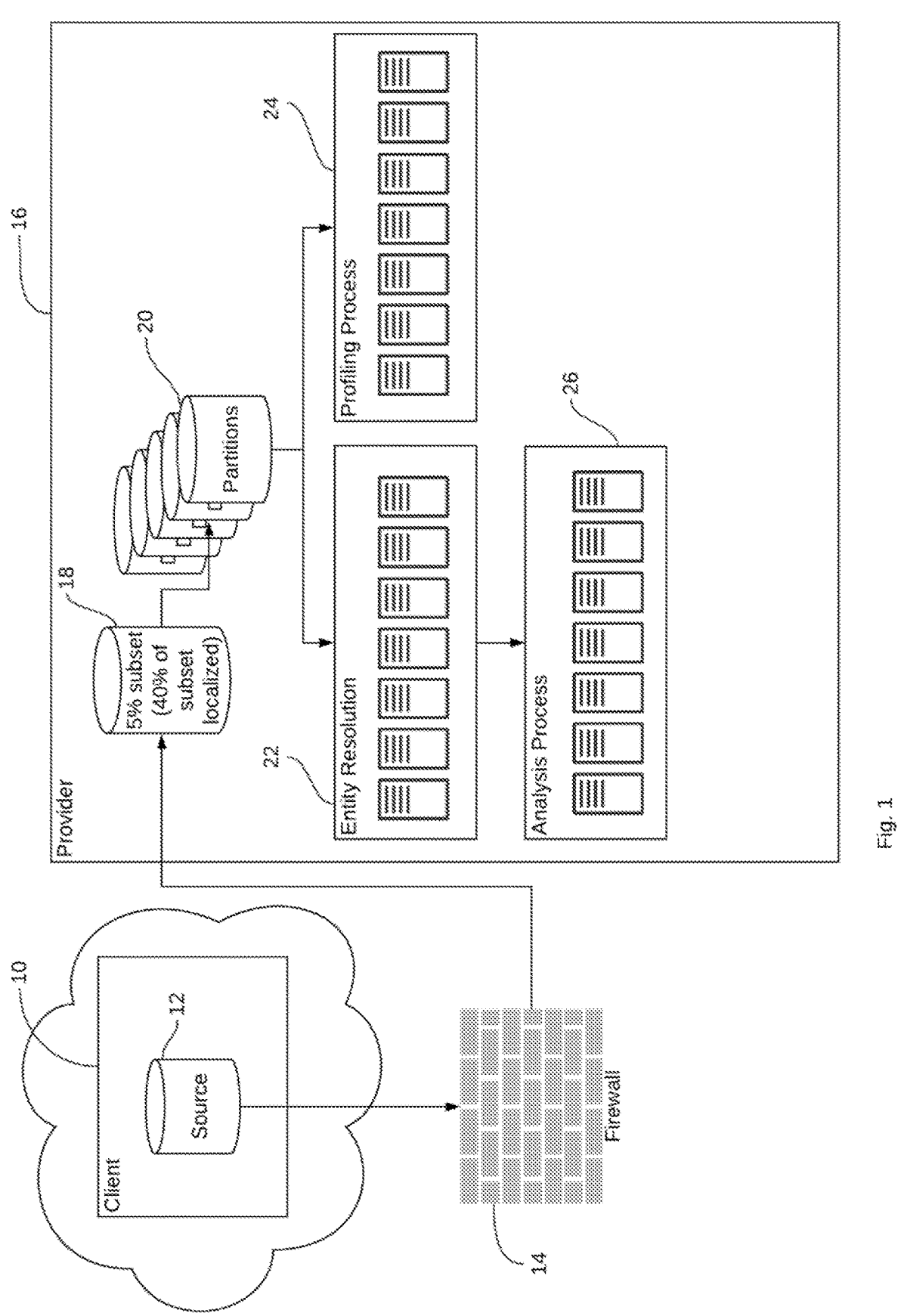
FIG. 1 is a hardware diagram for an embodiment of the present invention.

A system for implementing the method embodiments described herein is shown in FIG. 1. Client 10 is a server or servers connected to source 12, which is a database containing data pertaining to objects. It may be in the form of a data graph or any other form. Provider 16 is also implemented as a server or servers. Client 10 and provider 16 communicate electronically across a network, such as the Internet. Client 10 may be protected from unauthorized network access by a software and/or hardware firewall 14. Provider 16 includes subset 18, which is a local database for storing information received from client 10 for analysis. Subset 18 is divided into partitions 20 to facilitate parallel processing, as will be described following. The primary processes performed at provider 16 include entity resolution step 22 and profiling process 24, which may in some embodiments be implemented in parallel on the server or servers at provider 16. The results from entity resolution 22 are used for analysis process 26, also implemented on the server or servers at provider 16.

Figure 2:
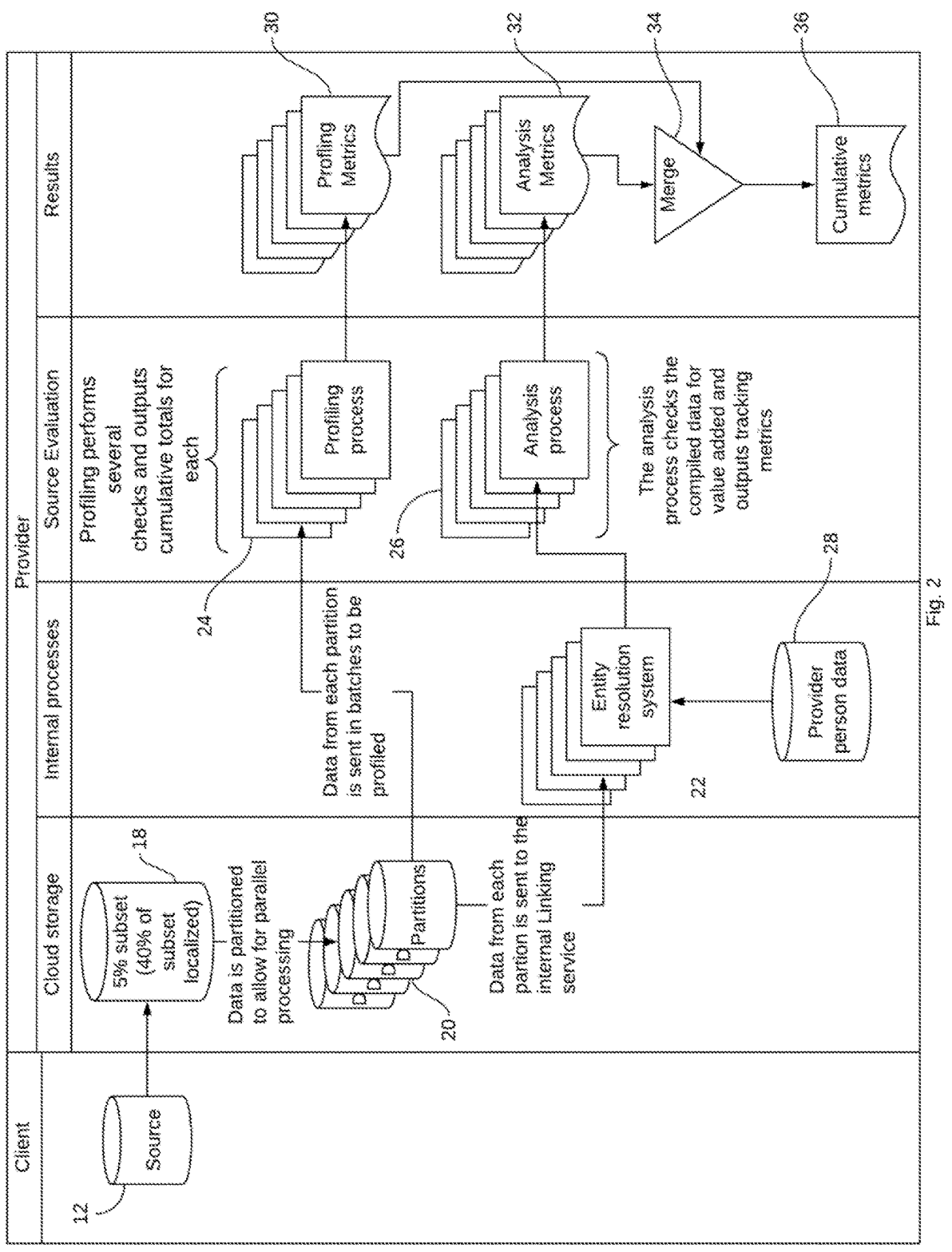
FIG. 2 is a swim lane diagram showing in overview a process according to an embodiment of the present invention

The trustworthy or believability scoring component of an embodiment of the present invention may now be described, with reference to FIGS. 2-4, with FIG. 2 providing a flow for scoring of new data being considered for inclusion in the data graph of an entity representation system. In order to evaluate new data that is considered for inclusion in the data graph, the prospective data vendors are requested to provide two separate samples. These samples, in certain embodiments where the objects or entities are consumers, may be records pertaining to individual persons or households. These records are data structures that each contain information about a particular entity, and are divided into fields that each contain one particular data point or touchpoint concerning the associated entity.

The first sample is drawn from a geographically localized area and the number of records is about two percent of the data vendors' total base. The size of the geographically localized area and the percentage of the total base may vary in alternative embodiments, but the focus here is on localization of the sample. The second sample is about three percent of the data vendor's total base randomly chosen, excluding the localized area for the first sample. Again, the percentage of the total base may vary in alternative embodiments, but the focus is on pulling a percentage of the base from randomly chosen records outside of the identified geographic area. It will be understood that together the two samples from the example given above represent five percent of the total base, and thus the localized area sample, being two percent of the total database, is forty percent of the combined records from the first and second samples. This is the data that forms subset 18. Given a sufficiently localized area, this results in a dense representation within that localized area. For example, if the total base represents consumers in the United States, and the localized area is the State of South Carolina, then forcing forty percent of the total of the two samples to be from the State of South Carolina means that the data provider will need to provide a large percentage of its total number of records from South Carolina in order to meet this requirement. A "dense" representation may thus be defined herein as at least two percent of the total of the two samples, or forty percent of the total database. The data is then partitioned into partitions 20 for parallel processing in certain embodiments. The number of partitions 20 may be matched to the available processing capacity in the multi-processor or parallel processing environment.

Figure 3:
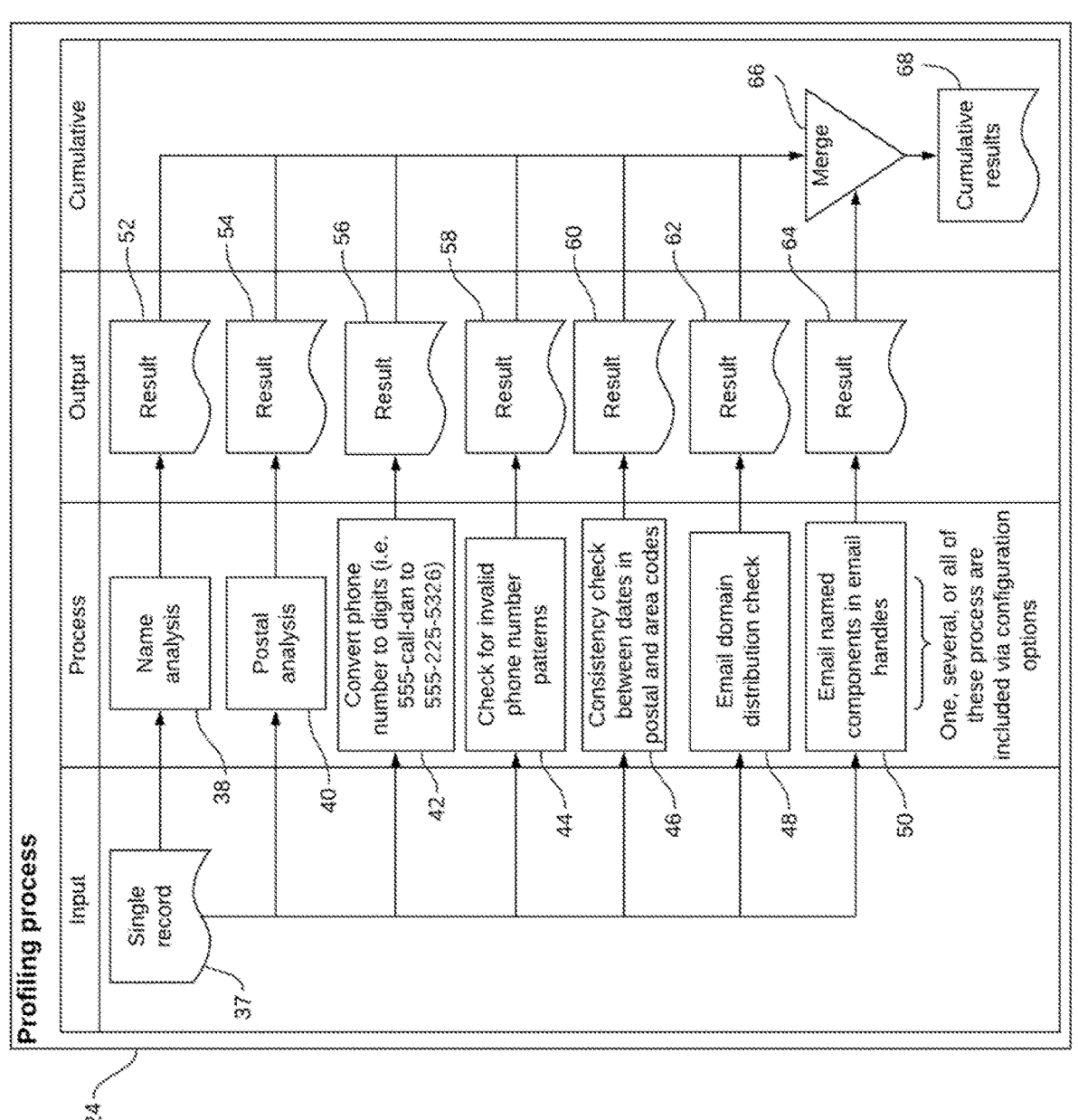
FIG. 3 is a data flow diagram for a profiling process according to an embodiment of the present invention.
Figure 4:
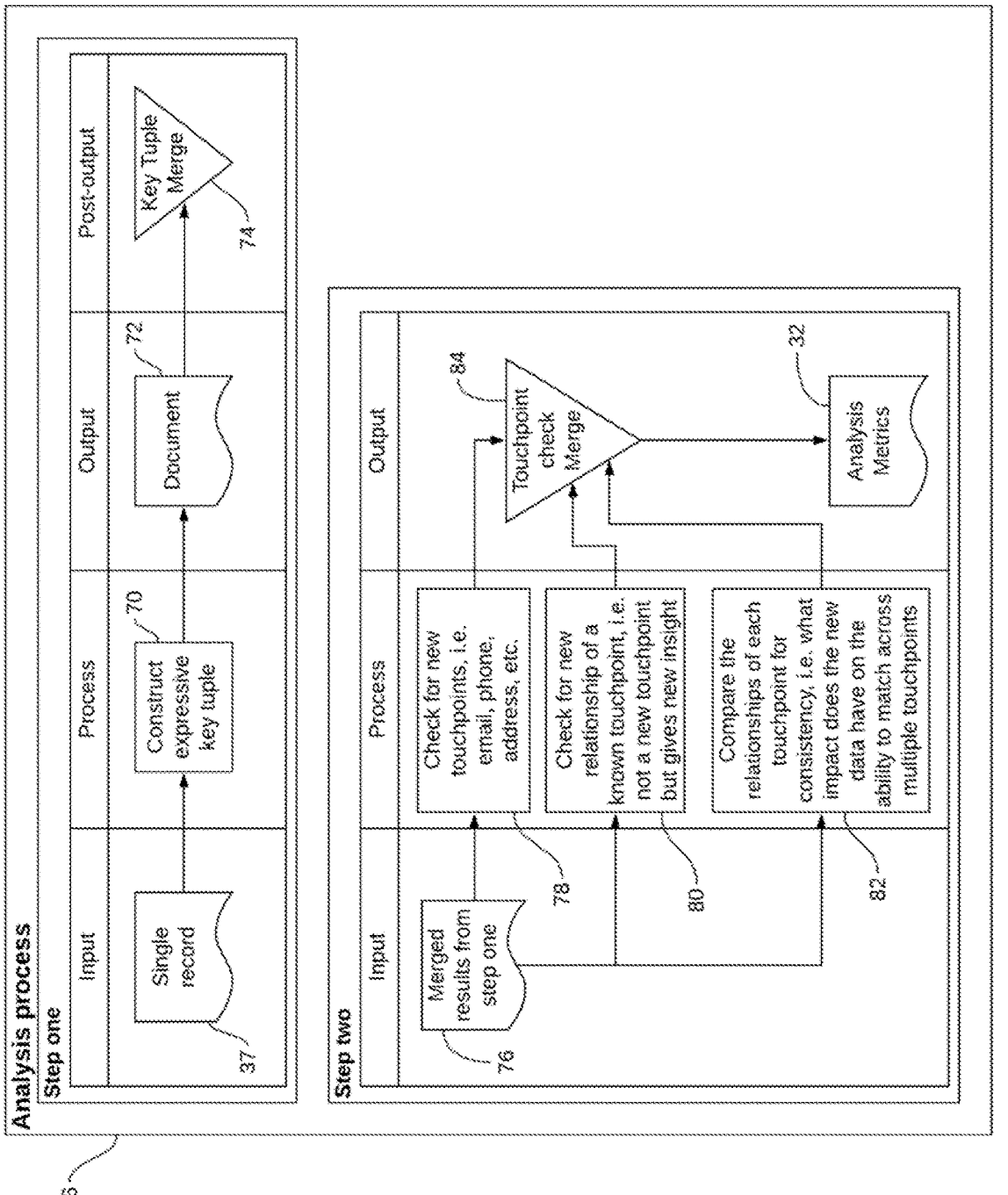
FIG. 4 is a data flow diagram for an analysis process according to an embodiment of the present invention.

Profiling process 24 is shown in greater detail in FIG. 3. The purpose of profiling process 24 is to achieve an understanding of the general quality of the data from source 12 based on subset 18. Once these two samples that make up subset 18 are obtained, the fields in the candidate source data are identified and the corresponding relationships between sets of fields are identified. For example, these sets of fields may include postal state/phone area code related sets; gender/age related sets, and the like. The single fields and related sets of fields for each individual record 37 from subset 18 are passed into the automated profiling process 24, which produces distributions, counts, and examples. These include, in various embodiments, the distribution of asserted name components in each record that are known person name components; the distribution of records per the asserted postal state; the counts of email instances for each record that contain a known person name component as well as containing a name component asserted in the record; the distributions of the area code/number of distinct exchange codes, exchange code/number of distinct area codes, and exchange code/number of distinct line numbers for each asserted phone number; the distribution of the types of maximum consistency between the city, state, and ZIP code for each postal address in each record; and the consistency of the asserted postal address state and the inferred state from the area code of each asserted phone number in each record. Similarly, in terms of provided email address instances, the distribution of the counts of instances for each included email domain, the number of those domains that are of questionable use for marketing and identity resolution purposes as well as the total count of such email instances, the number of email instances that contain a known person name component, and the number of email instances that contain at least one associated person name component may also be included in certain embodiments. These steps are shown in FIG. 3 at processing steps 38-50, and their individual results are shown as output steps 52-64.

The scoring of the believability or trustworthiness of both individual records and the aggregate set of data, as well as the randomness of the two percent subset, is computed from the aggregate profile of these data summaries at merge step 66, and the cumulative result is given at cumulative results 68. This output is aggregated into a profiling scorecard separated into the two samples. These results are then compared to authoritative sources' distributions. Authoritative sources in the embodiment described herein may be, for example, US Census data, US Postal Service data, etc., but the invention is not so limited. Quality assessment is performed with respect to the authoritative source or sources.

In parallel with the operations described above, the two source data samples (i.e., the dense localized sample and the broader random sample) from subset 18 are passed into the match service of the entity resolution system 22. This processing is shown in greater detail in FIG. 4. Entity resolution system 22 uses identity graph 28, which is maintained by the provider of the services described herein. The records in identity graph 28 from the entity resolution system 22 use identifiers that are unique for each individual person, place, and household within the system. These identifiers are referred to herein as consumer links, address links, and household links respectively. They may take any form, so long as each is uniquely associated with a particular person, place or household. Various "cascade levels" are then considered as part of the match process. These may include, for example, a name plus postal address; postal address only; name plus telephone number; telephone number only; name plus email address; and email address only. The match service of the entity resolution system 22 returns the person identifier (or place identifier) for each matched cascade level from the input single record 37. The person identifiers are then anonymized to protect privacy and a resulting combined key value is computed In the aforementioned example, each key is a tuple constructed at expressive key tuple step 70. The tuples each contain a first sub-tuple of the "name+postal address" consumer and the "address only" address link for each asserted postal address, a second sub-tuple of the "name+phone" and "phone only" consumer links for each asserted phone number, and a third sub-tuple of the "name+email" and "email only" person identifiers for each asserted email instance. For example, the key (((1,99)), ((1,2),(−2)), ((1,1), (3,4))) indicates that the person identifier from the "name+postal" (1) represents a known (maintained) person in the entity resolution system and the postal address is also known (99). The next sub-tuple contains two inner tuples, representing that the record asserted two phone numbers. For the first phone number the "name+phone" consumer link (1) represents the same known person matched by the "name+postal address" level. However, the "phone only" person identifier (2) is a distinctly different person in the entity resolution system. The second phone number returned only a single value of −2, which represents that the phone number is not in the entity resolution system. The last sub-tuple ((1,1), (3,4)) indicates that there are two asserted email addresses. The first one returned the already identified person (1) as the match for both "name+email" and "email only". The second email address was matched to yet found different persons in the entity resolution system. At step 72, these computed key tuples are aggregated into a distribution document whose values are the counts of the records sharing the same key.

Multiple queries are run on this aggregate distribution and the combined results from step 72 are collected into a profiling scorecard at step 74. The resulting scorecard is then used to determine the level of trustworthiness of the candidate source file as well as the expected impact on the data graph if the data is added. If all of the person identifiers were the value of 1 in the associated key, then this indicates that the entity resolution system contains all of the relationship information presented in the associated records and there is little to no impact of those records for the system. If one or more phone or email instances give a different positive integer value from the others at the "name+" level this record indicates that the associated persons may in fact be the same person, which could lead to a consolidation of two or more persons in the system. On the other hand, if a phone or email instance returns a −2 value then not only are the matched persons related to that instance but also that this information is completely new relative to the entity resolution system. In general, merged results 76 are used for comparison identity graph 28 through entity resolution system 22. These include checking for new touchpoints step 78, checking for new relationships for a known touchpoint 80, and comparison of the relationships of each touchpoint for consistency 82. The results of these processes for all records 37 are merged at touchpoint check merge step 84, and output as analysis metrics 32.

An embodiment of the present invention calculates the quality or value of the data being presented, such as the extent to which the data may meaningfully extend the reach of the subject data graph. This begins by constructing a localized dense "sandbox" subset of the data graph's records, which will form a baseline for analysis. This baseline consists of at least eight million persons in one embodiment, but the number may vary in alternative embodiments. Next, the data source being evaluated is added to the sandbox and persons are formed. This new set of persons is then directly compared with the baseline set of persons. The differences (i.e., the deltas) between the baseline sandbox and modified sandbox are computed and categorized in terms of whether: (a) a person is created; (b) a person's defining entity representations have increased by resolution from a single representation; (c) multiple persons have consolidated into a single new person; or (d) a person has split into two or more different persons. These effects may occur, for example, where two different people have the same name, a person changes his or her name or address, a person's name is represented differently in different contexts, etc. The output of this step is aggregated and each of these categories is divided into those impacting a person in the baseline set that is important to the data service provider's clients (referred to herein as "actively sought after") and those that are "dormant." The distributions for the two resulting sets of the categories are added to the profiling scorecard.

It may be noted that this second component of the described embodiment of the invention naturally extends to many other cases. Multiple data sources can be added and removed in order to determine the impact of subsets of source data, which may be important in certain applications as most of the evolutionary steps of the data graph involve more than a single isolated source.

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system's memory capabilities may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included in the disclosure. All references cited herein are hereby incorporated by reference to the extent that there is no inconsistency with the disclosure of this specification. When a range is used herein, all points within the range and all subranges within the range are intended to be included in the disclosure.

The present invention has been described with reference to certain preferred and alternative implementations that are intended to be exemplary only and not limiting to the full scope of the present invention.

The invention claimed is:

1. A computerized method for performing source valuation within a parallel processing environment for a data source considered for inclusion in an entity resolution data graph, the method comprising the steps of:

using a plurality of processors in a parallel processing computer system to:

construct a first sample of the data source, wherein the first sample comprises a first subset of records in the data source associated with a dense representation of a geographically localized area;

construct a second sample of the data source, wherein the second sample comprises a second subset of records randomly selected from the data source, excluding the first subset of records;

automatically partition the first sample and second sample into a plurality of partitions using a partitioning algorithm that distributes data across multiple processors based on processing capacity, wherein each partition corresponds to an available processor within the parallel processing environment;

automatically identify corresponding relationships between sets of fields in the data source and nodes in the entity resolution data graph using automated field mapping algorithms that compare data structures and analyze entity relationship patterns;

execute in parallel across the plurality of processors a profiling process that analyzes one or more fields and the identified sets of fields to automatically generate sets of distributions, sets of counts, and sets of examples into a machine readable profiling scorecard that characterizes entity resolution quality metrics;

automatically aggregate the sets of distributions, set of counts, and set of examples into a machine-readable profiling scorecard that integrates entity resolution confidence scores with data quality assessments;

automatically compare the set of distributions, set of counts, and set of examples to at least one authoritative source distribution using statistical comparison algorithms to produce a quality score for determining data source trustworthiness, wherein the quality score combines data profiling results with entity matching validation;

pass the first sample and second sample into a match service, wherein the match service uses an identity graph comprising unique person identifiers, address identifiers, and household identifiers, and executes cascade level matching at a plurality of cascade levels;

return from the match service, for each record in the first sample and second sample, person identifiers for each of the plurality of cascade levels;

construct a key tuple for each record, wherein the key tuple comprises a plurality of sub-tuples each corresponding to a cascade level and containing person identifiers returned from the match service for that cascade level, wherein a first positive integer value indicates a known person in the entity resolution data graph, wherein different positive integer values for different cascade levels within a single record indicate that persons matched at different cascade levels may be the same person and represent a potential consolidation, and wherein a negative value indicates that a touchpoint is not in the entity resolution data graph and represents new information;

aggregate the key tuples into a distribution document whose values are counts of records sharing the same key; and determine, from the distribution document, a level of trustworthiness of the data source and an expected impact on the entity resolution data graph if the data source is added, wherein the expected impact indicates at least one of: new touchpoints to be added, new relationships for known touchpoints, or potential consolidation of persons.

2. The method of claim 1, wherein the first subset of records comprises about two percent of a total number of records in the data source.

3. The method of claim 1, wherein the second subset of records comprises about three percent of a total number of records in the data source.

4. The method of claim 1, wherein the sets of fields comprise postal state and phone area code.

5. The method of claim 1, wherein the sets of fields comprise gender and age.

6. The method of claim 1, wherein the authoritative source distribution comprises US Census data.

7. The method of claim 1, wherein the authoritative source distribution comprises US Postal Service data.

8. The method of claim 1, wherein the plurality of matched cascade levels comprises a postal address only level.

9. The method of claim 1, wherein the plurality of matched cascade levels comprises a name plus telephone number level.

\* \* \* \* \*